United States Patent
Sisler

[15] 3,662,734
[45] May 16, 1972

[54] RECIPROCATING, SENSITIVE SAW, WITH UNIDIRECTIONAL CUT, PARTICULARLY ADAPTED FOR USE WITH DIAMOND BLADES

[72] Inventor: Remo Sisler, Via Mercato, 3, Sommacampagna Verona, Italy

[22] Filed: Oct. 6, 1969

[21] Appl. No.: 863,950

[30] Foreign Application Priority Data

Oct. 4, 1968 Italy..............................61287 A/68
Mar. 15, 1969 Italy..............................61222 A/69

[52] U.S. Cl. ..............................................125/16 R
[51] Int. Cl. .................................................B28d 1/06
[58] Field of Search............................125/16; 83/647

[56] References Cited

UNITED STATES PATENTS

| 1,674,519 | 6/1928 | Patterson | 125/16 |
| 173,709 | 2/1876 | Young et al. | 125/16 |
| 108,424 | 10/1870 | Young | 125/16 |
| 364,459 | 6/1887 | Young | 83/647 X |

*Primary Examiner*—Harold D. Whitehead
*Attorney*—Young & Thompson

[57] ABSTRACT

A reciprocating saw, particularly adapted for stone cutting, has unidirectional cut because the blade is raised on the return stroke. The blade follows a path which is arcuate at the end of the return stroke (FIG. 7) so as to engage the saw gradually with the workpiece. The saw is progressively fed downwardly; but when the saw encounters a particularly resistant portion of the workpiece, then the downward movement is retarded until the resistance is overcome (FIG. 9). A special recirculating roller bearing system (FIG. 11) permits heavy load on the blade without hindering vertical movement of the blade.

8 Claims, 16 Drawing Figures

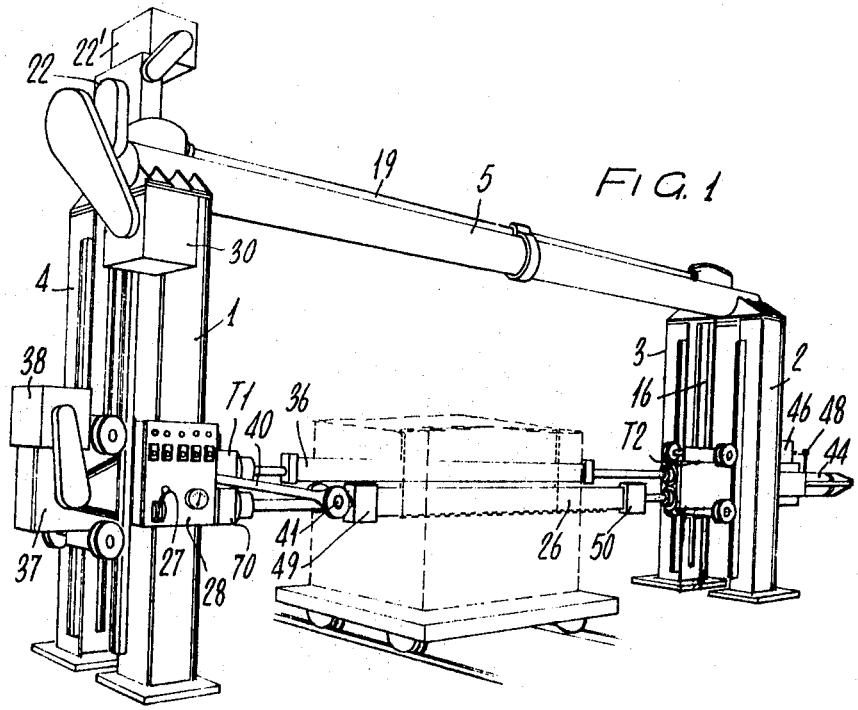
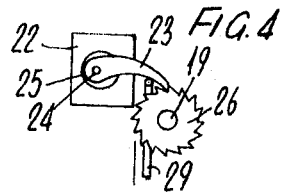
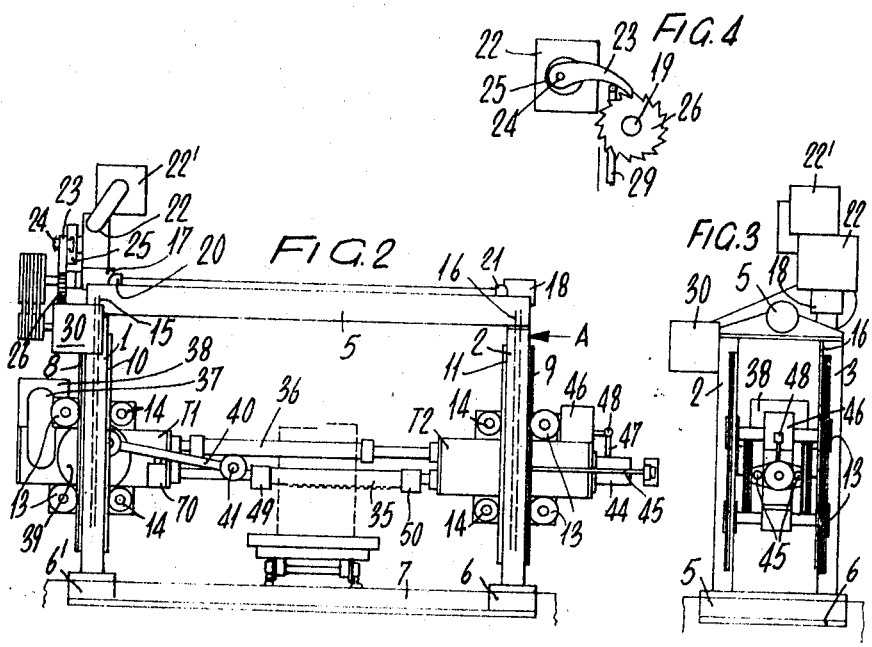
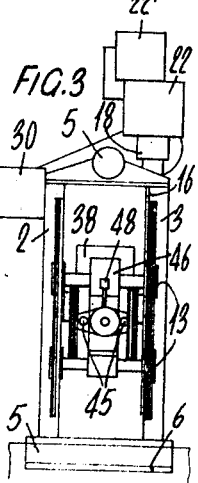

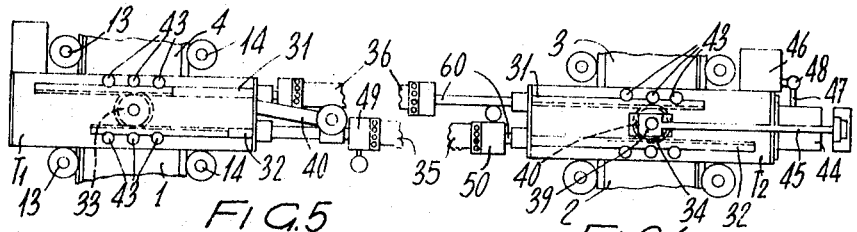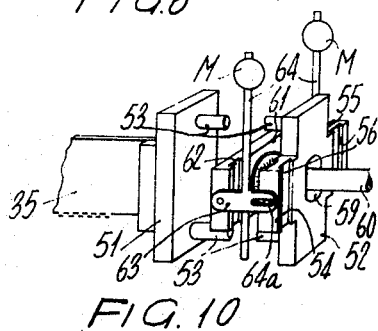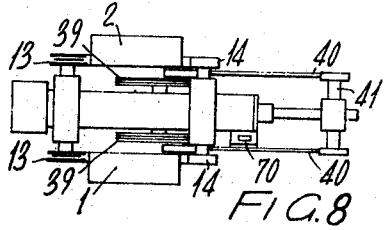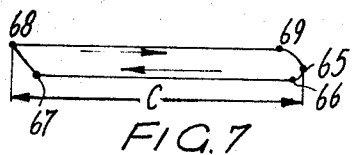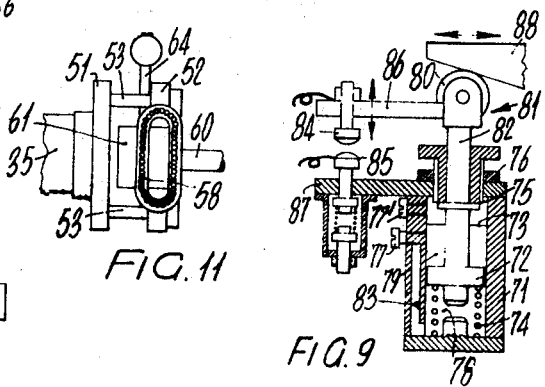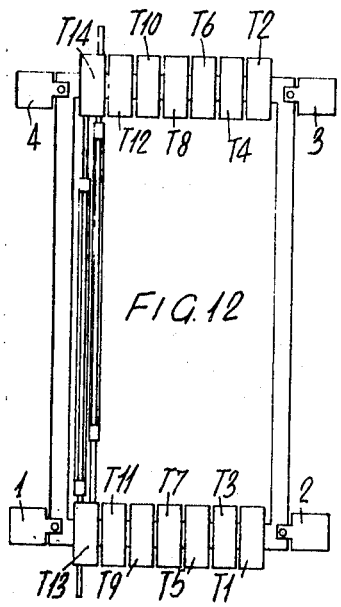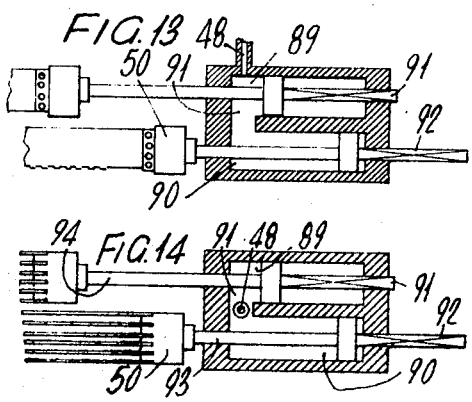

RECIPROCATING, SENSITIVE SAW, WITH UNIDIRECTIONAL CUT, PARTICULARLY ADAPTED FOR USE WITH DIAMOND BLADES

The present invention relates to a reciprocating sawing machine, with either a diamonded blade for cutting marble, granite or stone, or a blade for metals in general, with unidirectional cut, sensitive and rapid.

Today, with the introduction of the diamonded blade, sawing machines for cutting blocks of marble, granite or stone by reciprocating motion and with one or more diamonded blades do not have the necessary technical requirements or mechanical characteristics, and so the combination "saw - diamonded blade" is significantly inefficient.

In fact, in existing reciprocating saws, the diamonded blades are not used in a rational way because the blades themselves remain in contact with the cut, (or rather, with the material being cut) both in the forward and backward movements (bi-directional cut) which makes the discharge of the cut material difficult and causes significant damage to the cutting tool itself, as will be shown later.

The mechanical properties of the modern diamonded blade, manufactured by inserting a series of diamonds, which do the actual cutting, in an appropriate holder, derive from the fact that the cutting edges emerge from the holder bit by bit as the latter becomes worn due to the abrading action caused by the particles of material detached during the cut. Now if the blades are controlled in such a way that they cut in one direction only, the cutting edges will be automatically reinforced on the side opposite to the cutting side by a natural shoulder which, if removed as occurs with a bi-directional cut, causes the detachment of the diamonds themselves.

Furthermore, existing machines are insensitive because the cutting operation is controlled by devices which create a mechanical progression in such a way that when the cutting edges encounter an area of increased hardness such as a node, they are subjected to much greater forces than those necessary for correct cutting. In addition the blade or blades are forced to deviate from their straight line when they reach such an area of increased hardness, in spite of the high tension of the blade, and this damages the material being cut.

The machine which forms the subject of the present invention is distinguished from existing machines for the same purpose, in that it is designed to resolve the cutting problems already mentioned and above all, those problems which derive from the use of diamonded blades - blades which, as already mentioned, consist of a series of diamond points inserted in an appropriate holder.

The machine of the present invention comprises a structure in which the mechanisms causing the movements of the blades move in guides fixed to four external principal supports. The blades are fitted to the drive mechanisms by suitable clamps and thus achieve their reciprocating motion.

Contemporaneously with the horizontal reciprocating motion in the cutting direction, the blades are also subjected to a perpendicular movement in such a way that while the blades are in contact with the block of marble (i.e. with the cut) during the whole of their forward movement, they are raised as much as necessary to clear the cut on their return to the beginning of the stroke.

In this way a "one way cut" is achieved which, in addition to performing the cutting operation in the correct manner, aids the expulsion of cut material by forcing it towards the outlet with each cutting stroke.

Two ways of constructing the machine which is the subject of this invention, are shown diagrammatically as examples in the accompanying drawings, in which:

FIG. 1 shows a perspective view of the machine.

FIG. 2 shows an outline of the front view of the machine in the first form of construction.

FIG. 3 shows a side view of the machine in FIG. 2.

FIG. 4 shows a detail of the machine. FIGS. 5 & 6 together show a mechanism for the reciprocating cutting movement of the blades ensuring their tension.

FIG. 7 shows the path of movement of the blade.

FIG. 8 shows the plan view of FIG. 5.

FIG. 9 shows the timing mechanism which momentarily stops the slow downward mechanism.

FIGS. 10 & 11 show respectively, a perspective and a partial longitudinal section of the mechanism designed to produce the reciprocating motion of the tensioned blade perpendicular to its cutting motion.

FIG. 12 is a partial plan view, seen from above, of a multibladed machine.

FIG. 13 shows a hydraulic mechanism for the reciprocating motion of a single bladed machine.

FIG. 14 shows a hydraulic mechanism for the reciprocating motion of a multi-bladed machine.

Figure 15:
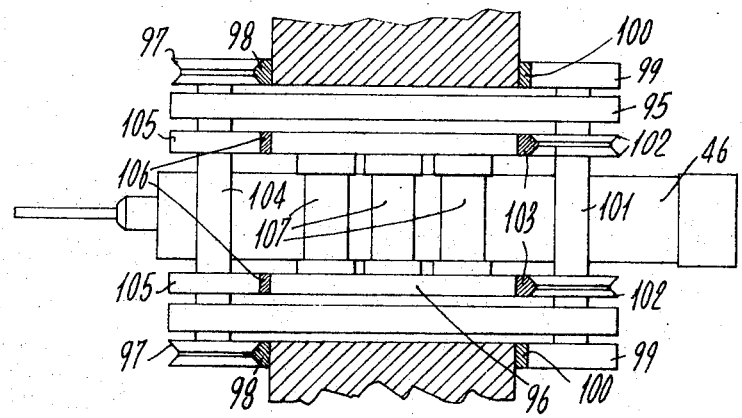
FIG. 15 shows the horizontal section of a detail of the head on a variant of the machine represented by the invention.

Reference to FIGS. 1, 2 and 3 shows how the machine is constructed with four external supports, 1, 2, 3 and 4, connected by the transverse beam 5, to form the structure.

The base consists of the elements 6 and 6', cemented in place and connected by tie-bars 7. On the above mentioned supports 1, 2, 3, and 4, the railed tracks 8 and 9, are fitted externally and the flat guides 10 and 11 internally. On the tracks run the heads, $T_1$ and $T_2$, by means of grooved 13 and flat 14 wheels on the rails and guides respectively.

The simultaneous vertical movement of the two or more heads, in this case $T_1$ and $T_2$, is controlled by screws 15 and 16 through the right-angle drives, 17 and 18, connected together by the cross-shaft 19 with bearings at 20 and 21.

A control panel 28, which consists of mechanical and electro-magnetic controls and hydraulic indicators makes human errors in the control of the machine impossible.

A motor/gear unit, consisting of the motor 22', the reduction gear 22, and belt drive, drive pawl 23 (FIG. 4) connected to crank lever 24, inserted and eccentrically fitted in the opening cut diametrically in plate 25, which is rotated by the above mentioned motor/reduction gear unit.

The cranked lever can thus be moved radially as desired and gives to the pawl, which controls the cog wheel 26, an alternative motion in the direction of slow descent of the blade-carrying head, thus creating the possibility of engaging one or more teeth of the drum at a time.

In other words, as best seen in FIG. 4, when the motor 22' is actuated, the cranked lever 24 will rotate in the circular opening in plate 25 and the eccentric crank thereon, on which the pawl 23 is swingably mounted, will move in a circular path. The left end of the pawl 23 as seen in FIG. 4 thus moving in a circular path, the right end of the pawl will have a reciprocatory component of motion such as to advance the cog wheel 26 one step per revolution of crank lever 24. This results in a slow stepwise rotation of shaft 19 and hence of screws 15 and 16.

The lever 27, fitted on control panel 28, (FIG. 1) sets in motion a shaft 29, (FIG. 4) by means (not shown) which ensure the disengagement of pawl 23, from cog wheel 26, and the cutting of the electrical circuit to motor 22', (FIGS. 1 and 3) when it is required to disengage the slow descent mechanism.

Lever 27, in the position described above, controls the low voltage electrical circuit of the manual control of the fast descent motor which, connected directly to shaft 19, drives the blade head mechanisms, fitted with limit switches in both directions, in the movements of descent and rapid return necessary for the quick positioning of the blades in the position required.

Returning lever 27 to its original position therefore, cuts the current to rapid descent and return motor 30, and re-engages pawl 23, in toothed drum 26, which thus causes the fast motor group to remain in neutral.

The control box 28, also provides the possibility, through an instrument, of selecting the pressure required in the hydraulic device which tensions the blades, subjecting to that tensioning the starting of the motor/reduction gear unit which drives the blades and which in turn automatically permits the starting of the slow movement unit 22, 22' or the rapid descent and return unit 30.

In the present invention, the term "single-bladed machine" is meant to indicate a machine with only one cutting blade, the upper blade acting only to close the motion circuit as will be explained later, while the term "multi-bladed machine" is meant to indicate a machine with more than one cutting blade.

Each of the heads $T_1$ and $T_2$, as is shown in FIGS. 5 and 6 has a pair of racks in an oil bath, the upper and lower being respectively 31 and 32. These are connected by means of a pinion (33 for $T_1$ and 34 for $T_2$). The racks also roll on bearings 43.

The ends of racks 32, are attached cutting blade 35, while the ends of rack 31, are connected to the upper blade 36, which exists only to complete the movement linkage.

A motor/reduction gear unit 37, 38 (FIG. 1) transmits the reciprocating movement described above through fly-wheels 39, connecting rods 40, and shaft 41, which together constitute a crank/connecting rod system.

While the shaft of pinion 33 (FIG. 5) is supported at a fixed point in head $T_1$, bearings 39, (FIG. 6) move in the way 40, of head $T_2$, thus permitting horizontal displacement of pinion group 34, and with it the rack mechanism.

The appropriate and constant tension of blades 35 and 36 is ensured by the action of the hydraulic jack 44, which is connected to bearings 39, by means of rod 45.

From what has been described above, it will be seen that the simultaneous tension of the cutting blade and that of the blade above, self compensates due to the automatic pulling by gears 33 and 34 which engage with their respective racks.

The charging of the jack is achieved by a central electric pump 46 (FIGS. 1 and 6) through tube 47. With the by-pass pressure regulator 48, it is possible to tension, as desired, the blades.

Due to the presence of two special mechanisms 49 and 50, (FIGS. 1,5,6,10 and 11) the cutting blade, independently of heads $T_1$ and $T_2$ to which it is connected, can move vertically (the blade working horizontally) this movement combining with the horizontal reciprocating motion to create the "unidirectional" cutting cycle shown in FIG. 7.

Examining now FIGS. 10 and 11 in the attached diagrams, it can be seen that each of the mechanisms 49 and 50 for the vertical movement of the cutting blade consists of two opposed groups with between them a roller bearing with a continuous magazine for constant feed to the wheels attached respectively to the end of the cutting blade and the stem of the rack. The bearing consists of two plain tracks between which are placed the roller bearings continuously supplied from a cageless magazine designed in such a way as to feed the roller bearings at one end of the track and to recover them at the other. More precisely the first group consists of two parallel plates 51 and 52, fixed together and held apart by the two distance pieces 53. Plate 52 has two projections 54 and 55, at front and back in which are cut channels 56, accomodating the roller bearings 58, of the above mentioned bearing. Plate 52 in addition has a window, 59, through which passes the stem, 60, of a rack which is in turn attached to a plate 61, placed between the plates 51 and 53 mentioned previously. On the face of plate 61 in front of plate 52, other channels are cut for the rollers 58, of the above mentioned bearing. It can be seen that in this way, when pull is exercised in opposite directions on stem 60 and blade 35, by hydraulic jack 44 (FIG. 6) for example, plates 56 and 61 move towards one another and may slide relative to each other. In fact, the group fixed to the blade can move relative to the group fixed to the stem, this movement being limited by the piece 53.

To each side of plate 61 is pivoted a perpendicular rocker 63, to which is rigidly mounted the shaft 64, of a weight M. The other end of the rocker has a slot 64a, in which moves a pivot fixed to the corresponding side of plate 52.

From what has been explained above, provided that the weights of mechanisms placed at the extremities of a blade are themselves opposed (FIGS. 5 and 6), at the moment of reversal of the direction of movement of the blade, an alternative displacement is obtained, vertical to the direction of the cut.

In other words, when the stem 60 as seen at the right of FIG. 10 reciprocates substantially horizontally, the plate 61 will be driven by it and also the weight M. The weight M, however, is somewhat free to swing on the rocker 63 about the pivot of the rocker 63 on plate 61, which appears at the left of the rocker 63 as seen in FIG. 10. Therefore, when the stem 60 moves, for example, to the left as seen in FIG. 10, the inertia of the weight M will tend to swing the rocker 63 clockwise so that the shaft 64 is depressed, and with it the plates 51 and 52 and the blade 35. However, when the stem 60 reverses and moves to the right as seen in FIG. 10, then the inertia of the weight M will tend to swing the rocker 63 counterclockwise as seen in FIG. 10, which will raise the shaft 64 and with it the plates 51 and 52 and the blade 35. Thus it is the inertia of the weight M which causes that weight to swing as described at the ends of the paths of horizontal movement of the blade, which in turn imparts to the blade the arcuate vertical movement at the ends of its path.

It should be explained that the amplitude of oscillation of the blades becomes limited when the blade meets areas of increased hardness. It follows that the slow descent is interrupted though the cutting action continues, the weights having the ability to maintain continuously the cutting action of the blade until the above mentioned amplitude of oscillation returns to its original value, this return automatically reinstating the slow descent.

In fact the weights M, when subjected to the reciprocating action of the cutting action of the blades, displace themselves by reaction in the direction opposite to the movement of the blade, thus causing through the action of their rockers, the downward or upward movement of the blade carrying mechanisms.

FIG. 7 represents pictorially the phases of the complete cycle of the movement of the cutters of the blades, a path which results from the combined reciprocating horizontal and vertical movements, synchronized one with the other. The distance C represents the travel of the blade.

In fact, the cutter which starts from point 65 moves from right to left in the direction of the cut to enter the groove at 66, moves to 67 and then rises, still at the end of the cut, up to point 68 after which it follows the return path to 69 and returns to the starting position at 65.

Referring now to FIGS. 1 and 2, the mechanism 70 is seen, which is shown in detail in FIG. 9 and which consists of an automatic control timer with "adjustable sensitive hydroelectric meter" which, through the impulses it receives from the cutting blade group, forms the sensitive element of the machine.

Considering the section of the mechanism (FIG. 9) it can be seen that its main elements are a cylinder 71, and plunger 72, mounted vertically on head $T_1$ in the case of a single-bladed machine.

The cylinder 71, contains oil to level 73, and the plunger 72 is subjected to spring 74, which tends to push it against the shoulder below the threaded ring 75, locked by nut 76, which can be in the position desired. The conically-seated screw 77, which is below the level of the oil, meters the flow of oil from the lower chamber 78, to the upper one 79. 77' is the oil filler screw.

When an impulse occurs on wheel 80 of tappet 81, mounted over the stem 82, of piston 72, (FIG. 9) it can be seen how the oil in chamber 78 passes through tube 83 into chamber 79. In this way the upward return of the piston occurs at a determined rate.

The electric contact which forms an integral part of the above mechanism, consists of a contact head with adjustable screw (or adjusting screw) and of the counter contact head box 85, the first being mounted on the arm 86, fixed to the tappet 81, and the box 85, to the plate 87, fixed to cylinder 71.

The counter contact head is subject to the action of a spring which tends to keep it in contact with the upper contact for a predetermined length of the travel of the piston 72.

The mechanism shown in FIG. 9 receives impulses from the diamond blade group, or other type of cutter, at the end of every cutting travel by means of the spigot or cam 88, fixed to the mechanism 49.

This timing mechanism controls the position of the blade or blades and reveals if they remain raised above their lower line of movement due to the existence of an area of increased hardness in the material being cut causing the seperation of contact 84 to break the electrical circuit to the slow descent motor every time that such a situation occurs.

Because the blade continues to cut, even with the motor for downward movement stopped, as it is kept in position by the weights and their rockers, it overcomes the obstacle represented by the area of greater hardness, and this having been achieved, passes the information by means of cam 88 to the "sensing" device which recloses the electrical circuit to the slow descent motor.

In other words, when the blade 35 is retarded by an obstacle, it will tend to be unusually high relative to the associated heads relative to which it moves vertically. The cam 88, which is movable vertically with the blade, will be high relative to the rest of the mechanism shown in FIG. 9. This means that the stem 82 will tend to rise under the action of the spring 74, this vertical movement being maintained steady by the bleed through tube 83, until the contacts 84, 85 separate and the circuit to the motor 22' is opened and the descent of the heads is stopped. As the blade saws through the obstacle, the blade will descend relative to the associated heads, until the contacts 84, 85 close, whereupon the motor 22' is again energized and the slow descent of the heads resumes.

In the hydraulic version, all the mechanisms of the machine remain the same while the moving parts in the heads $T_1$ and $T_2$ are replaced by groups of hydraulic cylinders.

In fact the parallel cylinders 89 and 90 shown in FIG. 13 formed in a single piece and intercommunicating at 91 create the new heads $T_1$ and $T_2$, maintaining the same operating characteristics as the previous ones because the presence of oil in cylinders 89 and 90 connects the pistons interdependently.

The external stems 91 and 92 in FIGS. 13 and 14 are of square section to avoid rotation of the pistons on their axes during movement. In the plan views of FIG. 12 and FIG. 14, the following are shown respectively — a multi-bladed machine with heads numbered $T_1$ to $T_{14}$ mounted in a chassis frame and guided by vertical channels which cause the simultaneous descent of all the heads, and a multi-blade with only two heads. From these diagrams can be seen how the axes of the stems 93 and 94 which drive the blades are arranged side by side in a horizontal plane.

While the non-cutting upper blades are necessary to complete the motion linkage of the single-bladed machine, in the multi-blade version the non-cutting blades are replaced by cutting blades as in FIGS. 12 and 14, so that applying the above mentioned mechanisms 49 and 50 to all the groups of blades, there will be two series of blades which may be arranged to cut simultaneously in opposite directions or consecutively in one direction only by fitting appropriate weights causing such movements independently.

Figure 16:
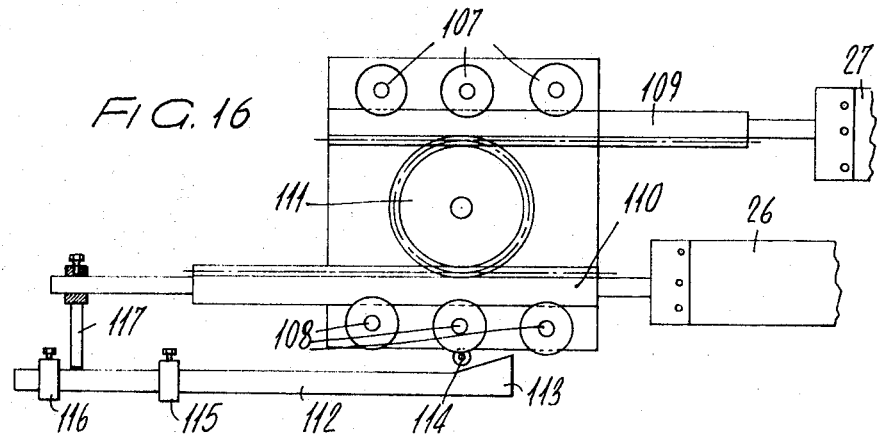
FIG. 16 shows a view along line 16 — 16 in FIG. 15.

Referring to FIGS. 15 and 16, it may be seen that they represent alternative ways of constructing the heads which cause the movement perpendicular to the direction of the cut.

As can be seen in FIG. 15, each head consists of an external part 95, and an internal part 96, movable relative to the first. The external part 95, is fitted with wheels 97, which run in the flat guides, 100.

The shaft 101, of wheel 99 carries internal wheels 102 which run in guide rails 103, fixed to the internal part 96, of the head, while shaft 104, carries internal wheels 105, which run in the flat guides 106, of the above mentioned part 96. The internal part 96 is also provided with guide wheels 107 and 108 for the racks 109 and 110 which work together through free pinion 111, as can be seen in FIGS. 5 and 6.

On one side of the internal part is placed the device for the vertical movement of the blade, composed of a shaft 112, which has at one end the inclined plane cam 113, which when it comes in contact with the wheel 114 which is fitted to the internal part 96 of the head, raises it alternately.

The longitudinal movement of shaft 112 is obtained by the two blocks 115 and 116, fixed to the shaft itself, and against which the arm 117, fixed to the stem of rack 110, strikes.

From what has been said and shown in the attached diagrams, it will be appreciated that they represent a reciprocating sawing machine particularly suitable for cutting marble, granite, stone and similar materials, if diamonded blades are used. However, by adopting metal cutting blades, the machine could be used for cutting metals in general.

What is claimed as invention is:

1. In a reciprocating sawing machine having at least one cutting blade and comprising a frame including a pair of lateral supports, heads vertically movable on said supports and supporting between them said blade, means to move the heads slowly downwardly on said supports to cause the slow downward movement of the blade, and means to move the blade along a closed path having a lower cutting course and an upper return course whereby said blade cuts in one direction only; the improvement comprising means responsive to vertical movement of the blade relative to the heads when the blade encounters a region of increased hardness in the workpiece to stop said slow downward movement of the heads while maintaining the unidirectional cutting movement of the blade until the blade has overcome said region of increased hardness and thereafter to resume the slow downward movement of the head.

2. A machine as claimed in claim 1, said means to move the heads slowly downwardly comprising a freely pivoted jack engaging a toothed drum that rotates a horizontal shaft that drives two vertical screws through a transmission unit, said screws moving said heads vertically in said slow downward movement.

3. A machine as claimed in claim 2, and manually controlled means to disengage said toothed drum jack thereby to allow rapid descent of said heads.

4. A machine as claimed in claim 1, said responsive means comprising a cylinder and plunger with a variable bypass conduit between upper and lower chambers of said cylinder, a spring acting continuously against said plunger to urge said plunger in a direction to open two electrical contacts, said contacts being connected one to said cylinder and the other to the stem of said plunger, said contacts being in an electric circuit to a motor that drives said heads in said slow downward movement thereby selectively to open and close said circuit, said stem having at one end a tappet engageable with a striker fixed to one end of said blade, and spring means urging said cylinder contact toward said plunger stem contact.

5. In a reciprocating sawing machine having at least one cutting blade and comprising a frame including a pair of lateral supports, heads vertically movable on said supports and supporting between them said blade, means to move the heads slowly downwardly on said supports to cause the slow downward movement of the blade, and means to move the blade along a closed path having a lower cutting course and an upper return course whereby said blade cuts in one direction only; the improvement in which said blade moving means comprises relatively movable members carried by said head, weight means to move one of said members vertically with the blade relative to the other said member in response to reversal of the reciprocating movement of the blade, roller bearings disposed between said members, and a continuous feed magazine for constant supply of said roller bearings.

6. A machine as claimed in claim 5, said magazine having the shape of a vertically elongated oval.

7. A machine as claimed in claim 5, one of said members being connected to the stem of a rack and the other of said members being connected to an end of said blade, said members being so disposed that traction on the blade and rack moves said members toward each other, a pair of weights connected to a rocker pivoted to one of said members, said rocker having a slot in which slides a pivot fixed to the other of said members.

8. A machine as claimed in claim 5, said roller bearings comprising roller tracks and cageless flat guides between which the roller bearings run, said magazine being connected to said tracks so as to supply bearings to one and of said tracks and to recover said bearings from the other end of said tracks.

* * * * *